Figure 1:
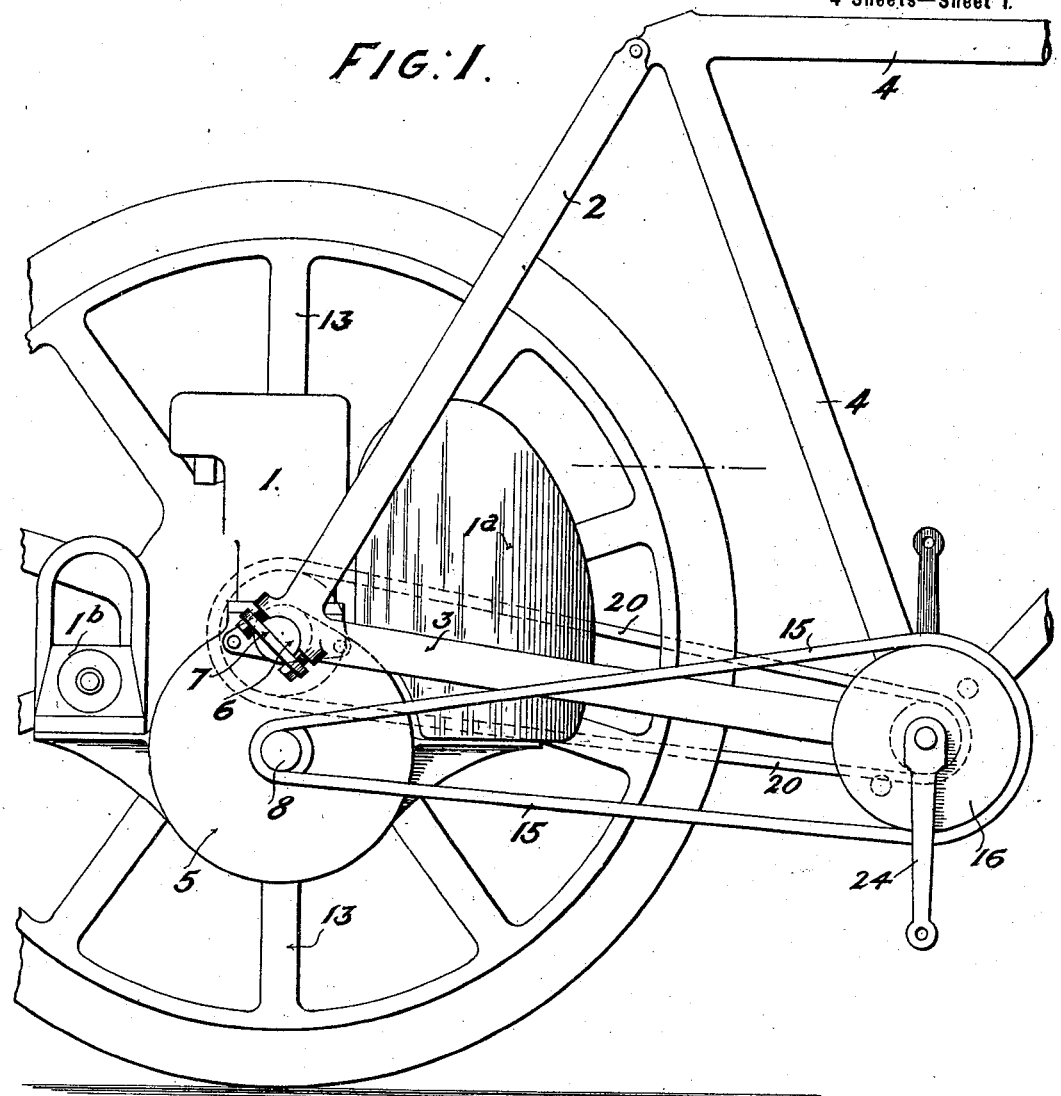

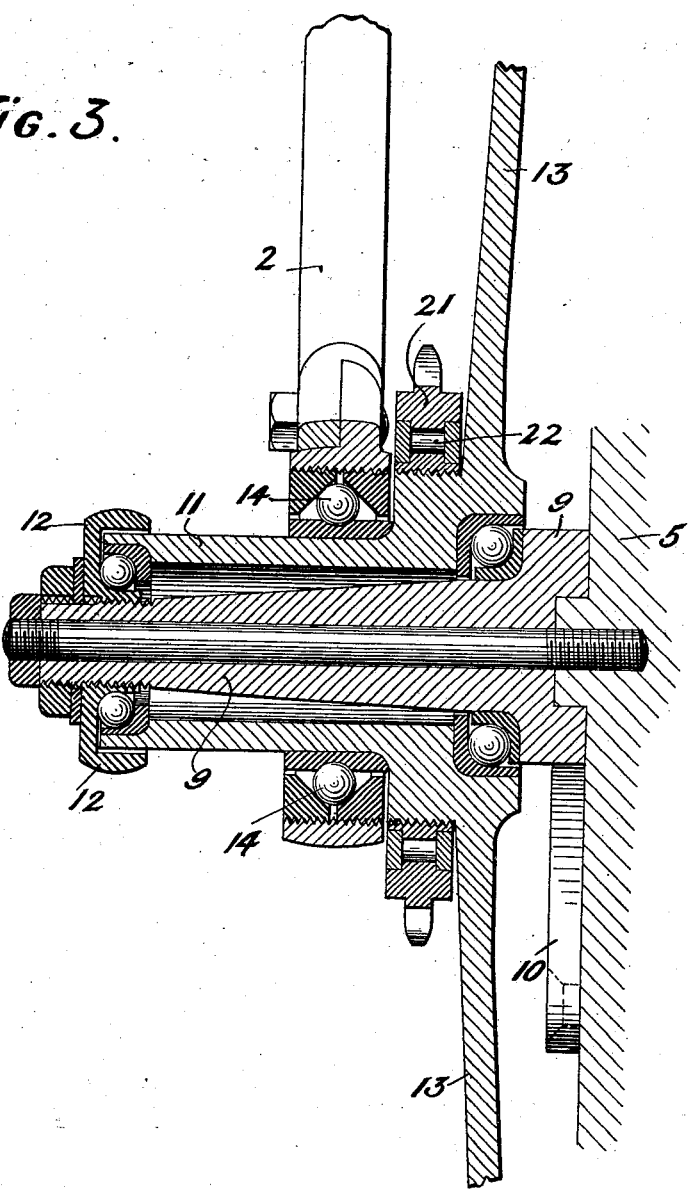

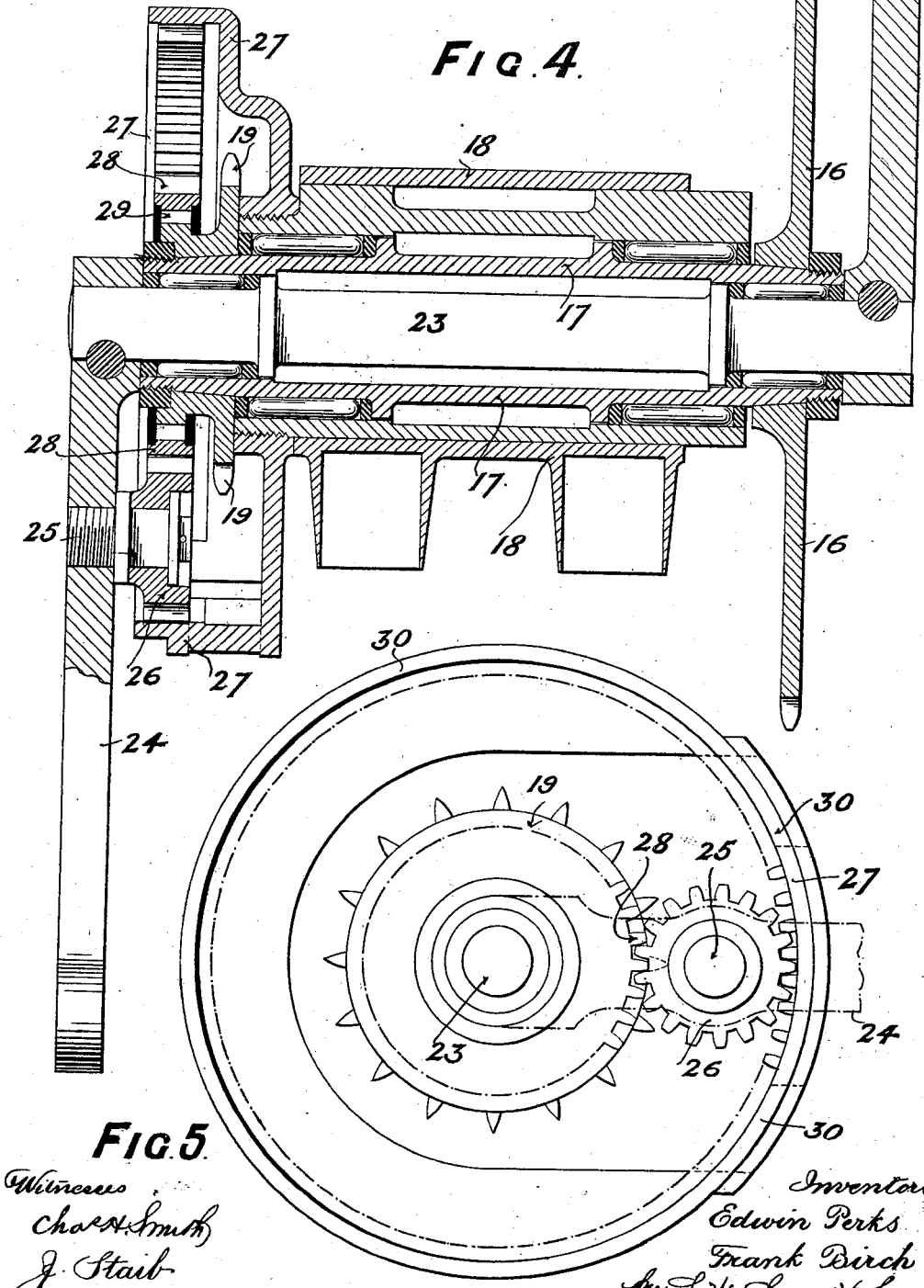

No. 708,827. Patented Sept. 9, 1902.
E. PERKS & F. BIRCH.
MOTOR MECHANISM FOR ROAD VEHICLES.
(Application filed June 4, 1902.)
(No Model.) 4 Sheets—Sheet 4.
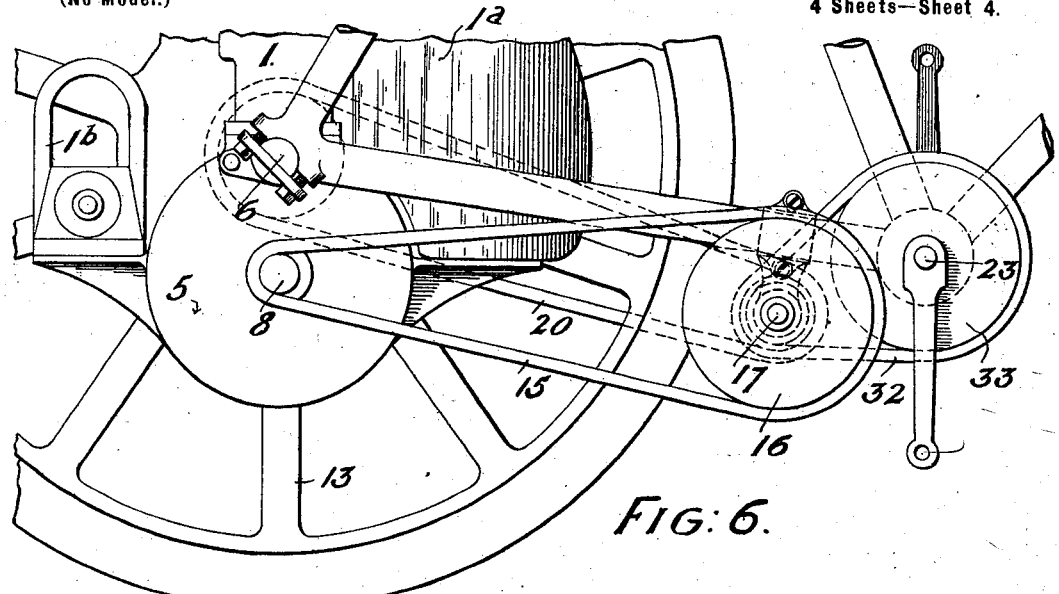
FIG: 6.
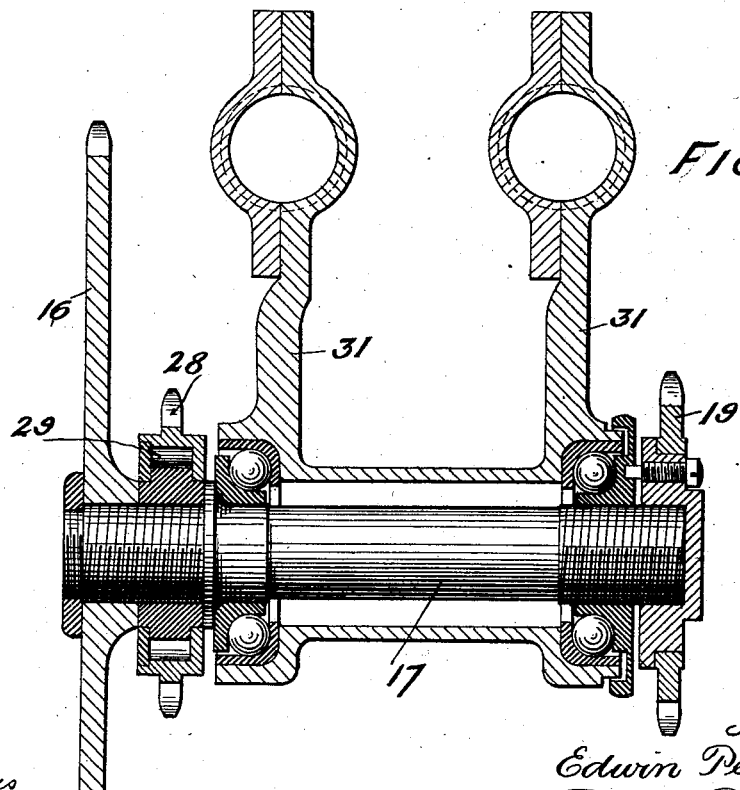
FIG: 7.
Witnesses
Chas H Smith
J. Staib
Inventors
Edwin Perks
Frank Birch
By attys L. W. Serrell & Son

UNITED STATES PATENT OFFICE.

EDWIN PERKS AND FRANK BIRCH, OF COVENTRY, ENGLAND.

MOTOR MECHANISM FOR ROAD-VEHICLES.

SPECIFICATION forming part of Letters Patent No. 708,827, dated September 9, 1902.

Application filed June 4, 1902. Serial No. 110,158. (No model.)

*To all whom it may concern:*

Be it known that we, EDWIN PERKS and FRANK BIRCH, subjects of the King of Great Britain, residing at Coventry, in the county of Warwick, England, have invented certain new and useful Improvements in Motor Mechanism for Road-Vehicles, (for which we have made application in Great Britain under No. 23,281 and date November 18, 1901,) of which the following is a specification.

In the United States patent specification No. 650,906 by Edwin Perks, one of the present applicants, there is described a motor-wheel in which the motor-engine, with the case containing the crank-shaft, is located within the wheel in such a position that the axis of the motor-shaft is eccentric to the axis of revolution of the wheel. In this position the motor and casing are rigidly held by hollow trunnions which are fixed to the framework of the vehicle. The road-wheel hub in such an arrangement is made in two parts, one part having a bearing upon one trunnion and the other part upon another trunnion, and disk or spokes extend from each half-hub to the felly of the wheel. The motion of the motor-shaft is conveyed to the road-wheel by means of gearing consisting of a pinion on the motor-shaft gearing with an internally-toothed ring fixed to the road-wheel. In this construction the motor becomes entirely inclosed or incased within the wheel, and appertaining to this arrangement there are some disadvantages. For instance, in order to obtain access to the motor one side of the wheel must be removed, while the means for governing and controlling the engine must pass through the hollow trunnions.

Now the object of our present invention is to so construct and arrange the mechanism that while the motor shall be contained within the wheel yet it shall not be wholly inclosed therein, but shall be quite open to access upon one side of the wheel for oiling, cleaning, adjusting, and the like; and our object is at the same time to so arrange that the motor shall be in a position to be readily connected with reserve tanks when traveling long distances; further, that the motor shall be capable of being connected up with controlling-rods for operating the engine without such actuating connections passing through hollow trunnions.

With these objects in view we provide a concave road-wheel within the concavity of which the motor is located, its location being such that the hub of the road-wheel is carried upon one of the trunnions by which the motor is supported, while the opposite trunnion is fixed in an adjustable manner to the framework of the machine, the axis of the motor crank-shaft being eccentric to the axis of the trunnions and the road-wheel. From the motor crank-shaft we provide driving connections by which the motion of the said crank-shaft is transferred at a reduced speed or speeds to the road-wheel. The arrangement of the motor within the concavity of the road-wheel with its motor-shaft eccentric to the axis of the said wheel enables us to connect the motor-shaft so as to drive a counter-shaft, which latter is mounted in bearings on the framework of the vehicle, and to then drive the road-wheel from the counter-shaft. This arrangement of driving-gear presents advantages in that, for example, it provides simple means for the reduction of speed between the motor and the road-wheel, while it also allows of the convenient application of overrunning clutches for freeing the engine and for freeing the pedal-driving shaft where such is employed.

The invention is clearly illustrated in the accompanying drawings.

Figure 2:
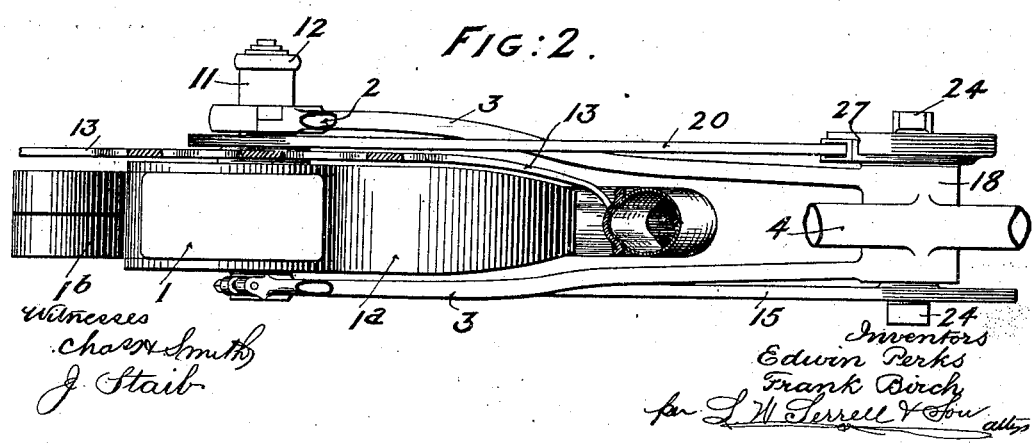

Figure 1 is an elevation of the rear portion of a vehicle, in which the motor mechanism is constructed and arranged according to the present invention, this view showing the invention applied by way of example to a bicycle. Fig. 2 is a sectional plan view of the portion of the vehicle shown at Fig. 1. Fig. 3 is a vertical transverse section looking from the rear part of the machine and showing the wheel-hub and the adjacent parts drawn to a larger scale than the previous figures. Fig. 4 is a section parallel with the axis of the pedal driving-shaft of the vehicle and showing an arrangement of the counter-shaft, and Fig. 5 is a side view of the gearing shown at Fig. 4. Fig. 6 is an elevation showing an arrangement of our invention in which the pedal driving-axle is mounted separately from the counter-shaft and connected thereto by gearing. Fig. 7 is a vertical transverse section showing the mounting and arrangement of the counter-shaft shown at Fig. 6 and drawn to a larger scale than the latter figure.

Referring to Figs. 1 to 5 of the drawings, the motor-engine 1, which may conveniently be an explosion-motor, is placed between the ends of the rear forks 2 3 of the frame of the vehicle, that shown by way of example being a bicycle. Generally, as shown, we construct the engine-casing to carry the supply-tank and carbureter 1ª and the electric ignition device 1ᵇ. Upon one side of the motor crank-case 5 we provide a trunnion 6, the axis of which is parallel with and eccentric to the axis of the engine-shaft, and the trunnion preferably consists of a projecting stud of semicircular section attached by wings to the crank-casing 5, aforesaid, of the motor. The trunnion 6 is held to the fork ends 2 3 of the vehicle-frame upon the open side of the wheel by means of a removable plate 7, connected by bolts to the said fork ends. With this construction by loosening one of the bolts holding the plate 7 and tightening the bolt or bolts upon the opposite side the trunnion can be adjusted angularly in the fork ends and the crank-shaft 8 of the motor receives a proportional angular adjustment, which may be utilized to tighten or loosen the driving connections, which we will hereinafter describe. Upon the opposite side of the motor-casing and coaxial with the trunnion 6 there is fixed a second trunnion 9, which is clearly shown in the vertical section at Fig. 3. In the construction we have illustrated the trunnion 9 is secured by wings 10 to the motor-casing 5. The trunnion 9 may be made either tubular or solid and is circular externally, being constructed to carry ball-bearings in order to support the hub 11 of the road-wheel. The ball-bearings of the road-wheel hub are clearly shown at Fig. 3 and are adjustable by screwing the cup 12 upon the trunnion 9, and this cup being normally stationary provides a convenient step by which the rider may mount or dismount onto or from the machine. The spokes or disk 13 of the road-wheel proceed from that side of the hub adjacent to the motor and are curved, as shown at Fig. 2 of the drawings, to partly contain the motor, and in the instance shown also the carbureter and ignition device. The concave spokes or disk carry the felly of the road-wheel which surrounds the motor and is located so that a vertical plane passes centrally through the motor and through the wheel-felly. Mounted upon the exterior of the wheel-hub is a ball-bearing 14, to the case of which the ends of the rear forks of the machine-frame upon that side are connected, and thus further support the motor.

With the arrangement and construction of parts which we have just described—that is, with the motor carried by trunnions fixed to the framework of the vehicle and contained within a concave road-wheel, so that the axis of the motor is below the axis of the road-wheel—it is obvious that the motor-shaft may be geared to the road-wheel in any well-known or suitable manner—as, for instance, in the manner shown in the specification of the hereinbefore-referred-to patent, No. 650,906, granted to Edwin Perks. However, according to the present invention we preferably employ the counter-shaft carried in bearings upon the framework of the machine, by which the motion of the motor-shaft can be conveniently transferred to the road-wheel. This arrangement is shown at Figs. 1 and 2, where a sprocket-wheel fixed upon the motor-shaft 8 drives, by means of a chain 15 or equivalent, a wheel 16, which is fixed upon a sleeve-shaft 17, (see Fig. 4,) carried in bearings upon the framework of the machine. In the construction we are now dealing with the sleeve-shaft 17 is carried in roller-bearings in the bottom bracket 18 of the bicycle-frame, and upon the opposite end of the sleeve-shaft 17 there is fixed a sprocket-wheel 19, from which a chain or equivalent 20 extends to a sprocket-ring 21 upon the road-wheel hub. This sprocket-ring 21 is more clearly shown at Fig. 3, and it is connected to the road-wheel hub by an overrunning clutch 22 of any suitable construction, but so arranged that the road-wheel in its forward motion can overrun the said sprocket-ring 21. By these means the road-wheel of the vehicle can travel downhill or the vehicle can be wheeled forwardly without operating or giving motion to the motor, and the speed of the road-wheel is conveniently reduced relatively to the speed of the motor-shaft. This counter-shaft, which in the construction now being described is tubular, is to be connected to the pedal driving-axle, so that the counter-shaft can be driven by the pedals in order to start the motor or to drive the machine, if required. Referring to Fig. 4, the pedal-axle 23 passes through the sleeve-shaft 17 and is provided therein with suitable bearings. With this driving-gear it is desirable that the speed of the road-wheel relatively to the pedal-driven axle should be increased, and to this end we provide upon the interior face of one of the pedal-cranks 24 a stud-axle 25 to carry a toothed pinion 26, gearing with the internal teeth formed upon a stationary wheel or casing 27, which is carried by the bottom bracket. The pinion 26 also gears with a toothed ring 28, connected by a suitable overrunning clutch located at 29 with the sprocket-wheel 19 upon the sleeve-shaft. By this construction when the crank-axle is revolved in a driving direction the sprocket-wheel 19 will be revolved at a proportionally-increased speed and the road-wheel will be driven in a forward direction, as will also the motor. When the pedal-cranks are held stationary, the sleeve and sprocket 19 thereon will overrun the toothed ring 28. The chain or equivalent connection 20 passes into the casing 27 and around the sprocket-wheel by apertures 30 in the said casing, as shown at Fig. 5.

The construction we have described allows for the convenient adjustment of the tension of the driving-chains 15 and 20. Thus the motor itself is capable of angular adjustment about its trunnions, as we have previously stated, and this adjustment can be used to tension the chain or belt 15, while we arrange the bearing of the counter-shaft 17 in a casing which is itself eccentric and is carried in the framework of the vehicle, as is a practice in some of the rear-pedal-driven bicycles constructed at the present time, whereby rotary adjustment will have the effect of shifting the axis of the counter-shaft and of adjusting the chain 20. It will now be understood that by this construction when the machine is wheeled forward not only is the motor not brought into action, but the pedals also are not revolved, both remaining stationary automatically, and this is a considerable advantage. It is a laborious task to push a bicycle, for instance, uphill if the mere fact of revolving the road-wheel forward operates the motor, whereas this labor is obviated with our invention.

It is not essential that the counter-shaft should be made tubular to carry the pedal-axle, and at Figs. 6 and 7 we have shown a construction where the counter-shaft 17 is carried separately in a bearing-carrying bracket 31, pendent from the framework of the machine. In this instance the counter-shaft 17 carries, as before described, the sprocket-wheel 16, which is directly connected by the chain 15 to the motor-shaft. It also carries and has fixed to it the sprocket-pinion 19, through which the road-wheel is driven. The counter-shaft is further provided in this instance with a sprocket-ring 28, which is connected to the counter-shaft by a suitable overrunning clutch 29, and this sprocket-wheel 28 is connected by a chain 32, Fig. 6, to a sprocket-wheel 33 on the pedal-axle 23.

It should be understood that it is not essential that the counter-shaft should be in the precise position relatively to the framework of the machine as that shown in the drawings or that the motor must necessarily be in the rear wheel of the vehicle. Thus the motor may be applied to the front wheel of a tricycle and the counter-shaft may then be mounted in any convenient position upon the framework, so that it is conveniently accessible while the machine is running for the purpose of starting the motor.

What we claim as our invention, and desire to secure by Letters Patent, is—

1. In motor-vehicles, the combination of a framework, a motor-engine, trunnions projecting laterally from the casing of the engine eccentric to and parallel with the driving-shaft of same, means for rigidly fixing the trunnions to the framework of the vehicle to support the motor, a revoluble wheel-hub carried in bearings upon one of the motor-trunnions, a road-wheel felly surrounding and located in the vertical central plane of the motor-engine, concave spokes connecting the hub and the wheel-felly so that the motor-engine is partly contained within the dished wheel, and means for transmitting the motion of the engine crank-shaft to the road-wheel to rotate the latter, substantially as set forth.

2. In motor-vehicles, the combination with a framework, a motor-engine, trunnions laterally projecting from the engine-casing parallel with and eccentric to the motor-shaft, and means for rigidly fixing the first trunnion upon one side of the engine to the frame of the vehicle; of a revoluble wheel-hub mounted upon the second trunnion, a bearing-ring carried by the frame of the vehicle and encircling the wheel-hub to support the second trunnion, a wheel-felly surrounding and located in the central vertical plane of the motor-engine, concave spokes connecting the wheel-hub and felly so that the motor is partly contained within the dished wheel, and means for transferring the motion of the engine crank-shaft to the road-wheel to rotate the latter, substantially as set forth.

3. In motor-vehicles, the combination with a framework, an explosion-engine, trunnions laterally projecting from the engine-casing parallel with and eccentric to the driving-shaft of the engine, a supply-tank, a carbureter and electric ignition device carried by the motor-casing, and means for connecting the first trunnion upon one side of the motor to the frame of the vehicle; of a revoluble wheel-hub mounted upon the second trunnion, a bearing-ring carried by the frame of the vehicle and encircling the wheel-hub to support the second trunnion, a wheel-felly surrounding and located in the central vertical plane of the motor-engine, concave spokes connecting the wheel-hub and felly so that the motor is partly contained within the dished wheel, and means for transferring the motion of the engine crank-shaft to the road-wheel to rotate the latter, substantially as set forth.

4. In motor-vehicles, the combination with a framework, a fork upon the framework, a motor-engine located between the fork members, a non-circular trunnion projecting laterally from the engine-casing upon one side parallel with and eccentric to the motor-shaft, and a socket in the adjacent member of the fork within which the non-circular trunnion can be rigidly fixed to support one side of the engine and hold it stationary relatively to the frame; of a trunnion projecting from the other side of the engine-casing coaxial with the first trunnion, ball-bearings upon the second trunnion, a wheel-hub mounted and revoluble upon the said ball-bearings, a bearing-ring fixed to the second member of the fork-frame and surrounding the wheel-hub externally, and by which the second engine-trunnion is supported, and ball-bearings between the said ring and the wheel-hub, a flange upon the wheel-hub adjacent to the motor, concave spokes proceeding from the flange, and a wheel-felly connected to the spokes located centrally between the fork member of the frame and surrounding the motor, and means for transferring motion from the motor-shaft to the road-wheel to rotate the latter, substantially as set forth.

5. In motor-vehicles, the combination of a framework, a motor-engine, trunnions projecting laterally from the casing of the engine eccentric to and parallel with the driving-shaft of same, means for rigidly fixing the trunnions to the framework of the vehicle to support the motor, a revoluble wheel-hub carried in bearings upon one of the motor-trunnions, a road-wheel felly surrounding and located in the vertical central plane of the motor-engine, and concave spokes connecting the hub and the wheel-felly so that the motor-engine is partly contained within the dished wheel; of a counter-shaft carried in bearings upon the framework, means for transmitting the motion of the motor-shaft to the counter-shaft to drive the latter at a reduced speed and for driving the road-wheel from the counter-shaft at a still further reduced speed, a pedal-driven shaft to drive the counter-shaft and with it the road-wheel and the motor for starting the latter, and an overrunning clutch located between the pedal-shaft and the counter-shaft to permit of the latter overrunning the pedal-shaft when the motor is at work, substantially as set forth.

6. In motor-vehicles, the combination with a framework, a motor-engine having trunnions projecting laterally from its casing upon each side thereof parallel with and eccentric to the motor-shaft, means for rigidly connecting the trunnions upon one side of the engine to the frame of the vehicle to hold the engine stationary relatively to the said frame, a dished wheel revolubly mounted upon the second trunnion and partly containing the engine within its concavity, the felly of the wheel surrounding and being located in the central vertical plane of the engine, and a bearing carried by the framework and encircling the wheel-hub to support that side of the motor; of a counter-shaft carried in bearings upon the framework, sprocket-wheels on the motor-shaft and the counter-shaft, a driving-chain connecting the said sprocket-wheels to rotate the counter-shaft at a reduced speed, a second sprocket-wheel upon the counter-shaft and a sprocket-wheel upon the road-wheel hub, an overrunning clutch connecting the hub and its sprocket-wheel to allow the road-wheel hub to overrun its sprocket-wheel, and a driving-chain connecting the sprocket-wheels on the hub and counter-shaft for driving the road-wheels, substantially as set forth.

7. In motor-vehicles, the combination with a framework, a motor-engine having trunnions projecting laterally from its casing upon each side thereof parallel with and eccentric to the motor-shaft, means for rigidly connecting the trunnion upon one side of the engine to the frame of the vehicle to hold the engine stationary relatively to the said frame, a dished wheel revolubly mounted upon the second trunnion and partly containing the engine within its concavity, the felly of the wheel surrounding and being located in the central vertical plane of the engine, and a bearing carried by the framework and encircling the wheel-hub to support that side of the motor; of a counter-shaft carried in bearings upon the framework, sprocket-wheels on the motor-shaft and the counter-shaft, a driving-chain connecting the said sprocket-wheels to rotate the counter-shaft at a reduced speed, a second sprocket-wheel upon the counter-shaft and a sprocket-wheel upon the road-wheel hub, an overrunning clutch connecting the hub and its sprocket-wheel to allow the road-wheel hub to overrun its sprocket-wheel, and a driving-chain connecting the sprocket-wheels on the hub and counter-shaft for driving the road-wheel, a pedal-driven revoluble shaft for driving the counter-shaft to start the motor, and an overrunning clutch between the pedal-shaft and the counter-shaft to permit the latter overrunning the pedal-shaft when the motor is at work, substantially as set forth.

8. In motor-vehicles, the combination with a framework, a motor-engine having trunnions projecting laterally from its casing upon each side thereof parallel with and eccentric to the motor-shaft, means for rigidly connecting the trunnion upon one side of the engine to the frame of the vehicle to hold the engine stationary relatively to the said frame, a dished wheel revolubly mounted upon the second trunnion and partly containing the engine within its concavity, and a bearing carried by the framework and encircling the wheel-hub to support that side of the motor; of a tubular counter-shaft carried in bearings upon the framework, sprocket-wheels on the motor and counter-shafts and a driving-chain connecting the said sprocket-wheels to rotate the counter-shaft at a reduced speed, a second sprocket-wheel upon the counter-shaft and a sprocket-wheel upon the road-wheel hub, an overrunning clutch connecting the hub and its sprocket-wheel to allow the road-wheel to overrun its sprocket, and a driving-chain connecting the hub sprocket-wheel with that of the counter-shaft to drive the road-wheel, a pedal-shaft passing through and carried in bearings within the tubular counter-shaft, and gearing connecting the pedal-shaft and the sleeve-shaft by which the latter may be driven by the pedals to start the motor, and an overrunning clutch in the gearing between the counter-shaft and the pedal-shaft to permit of the counter-shaft overrunning the pedal-shaft when the motor is at work, substantially as described.

EDWIN PERKS.
FRANK BIRCH.

Witnesses:
WALTER HEWITT,
WALTER SIDWELL.